United States Patent [19]

Olason, Ray

[11] 4,301,984
[45] Nov. 24, 1981

[54] VEHICLE LOADING APPARATUS FOR AIRCRAFT

[75] Inventor: Olason, Ray, Seattle, Wash.

[73] Assignee: The Boeing Company, Seattle, Wash.

[21] Appl. No.: 972,150

[22] Filed: Dec. 21, 1978

[51] Int. Cl.³ ............................................. B64D 9/00
[52] U.S. Cl. .................................. 244/137 R; 104/49;
104/35; 105/275; 410/1; 410/6; 414/522
[58] Field of Search ....................... 244/137 R, 118 R;
104/35, 48, 49; 105/275, 368 B, 455, 159;
410/1, 6; 414/522, 537; 296/19, 6 SR

[56] References Cited

U.S. PATENT DOCUMENTS

| | | | |
|---|---|---|---|
| 1,271,812 | 7/1918 | Wagner | 105/159 |
| 1,545,890 | 7/1925 | Fowler | 410/1 |
| 2,042,382 | 5/1936 | Binkley | 414/522 |
| 2,476,538 | 7/1949 | Fowler | 105/368 B |
| 2,573,496 | 10/1951 | Runkle | 414/522 |
| 3,253,856 | 5/1966 | Yoshihiro | 296/68 |
| 4,050,655 | 9/1977 | Boque et al. | 244/137 R |

FOREIGN PATENT DOCUMENTS

| | | | |
|---|---|---|---|
| 1159993 | 12/1963 | Fed. Rep. of Germany | 104/49 |
| 1141612 | 9/1957 | France | 410/1 |
| 876150 | 8/1961 | United Kingdom | 244/137 R |

OTHER PUBLICATIONS

Robinson, Jr., "Grumman VTOL Aimed at Small-Ship Use", Aviation Week and Space Tech., Sep. 20, 1976, pp. 15-20.

Primary Examiner—Galen L. Barefoot
Attorney, Agent, or Firm—Lynn H. Hess; B. A. Donahue

[57] ABSTRACT

In an airplane adapted to carrying cargo, particularly wheeled and/or tracked vehicles, and having a side loading cargo door, a rectangular turntable is installed near the door. The turntable and its pivot are so located that (1) the turntable extends through the door when it is crosswise to the fuselaage and is totally enclosed in the airplane when it is aligned with the fuselage and (2) vehicles longer than the width of the door or width of airplane can be accommodated.

2 Claims, 10 Drawing Figures

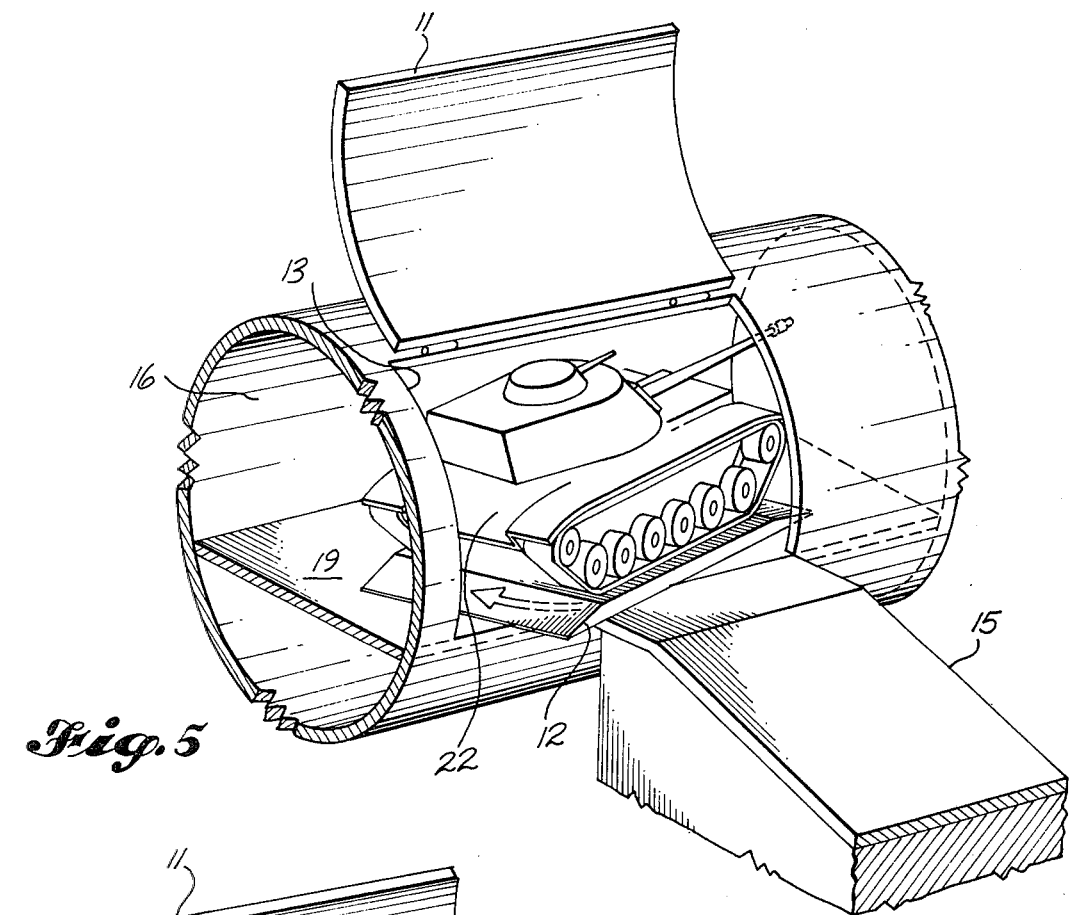
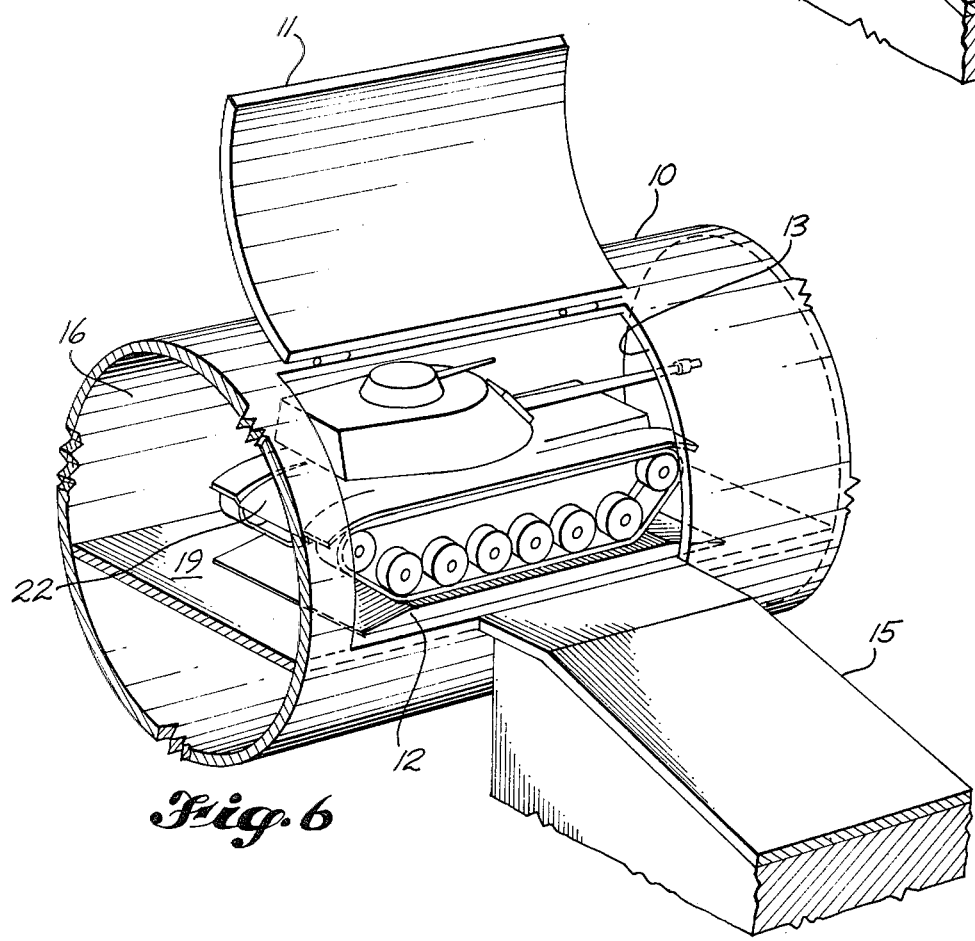

VEHICLE LOADING APPARATUS FOR AIRCRAFT

BACKGROUND OF THE INVENTION

This invention relates to the transportation of heavy equipment by airplanes, and in particular to the transportation of wheeled or track laying vehicles.

There is an increasing need for such transportation to support construction work in remote and/or inaccessible areas and for military purposes. Furthermore, in times of war or other emergencies there may be an urgent need to increase the capability for such transport as rapidly and economically as possible. Further, particularly for war time use, it would be necessary that the loading and unloading of the vehicles involve minimum of complication of equipment and procedures and a minimum of ancillary equipment. Rapid increase in capability could involve converting passenger aircraft to transports capable of carrying vehicles and it would be vital that the conversion be made as quickly and economically as possible. Such conversions would involve installing cargo doors in the sides of the airplanes and, for structural and economic reasons, it would be important that the door size be kept as small as possible relative to the maximum size vehicles which can fit into the body of the airplanes. Also, in aircraft with door size already established, it is important to accommodate as great a vehicle length as possible in order to optimize the utility of the aircraft.

Increased capability can also be provided by utilizing airplanes designed primarily as tankers for refuelling other aircraft. In tanker airplanes the full payload of fuel can be carried below the floor. Thus the volume above the floor is available to carry cargo when the airplanes are not needed for their primary purpose or for both purposes when circumstances so dictate. In this instance it is important that the adaptation of the airplane to serve the secondary purpose of carrying cargo involves a minimum of added cost and weight. Therefore, again, the door should be as small as possible relative to the dimensions of the cargo space and the vehicles to be transported. Also, the apparatus should be simple and economical as explained above.

There are a variety of existing cargo loading methods and apparatus, ranging from highly sophisticated concepts to those which are rudimentary but effective. U.S. Pat. No. 4,050,655, entitled "Cargo Loading Method and Apparatus," issued to Robert E. Bogue, et al., shows an example of a sophisticated concept. One of the advantages of the concept is that cargo units longer than the width of the door or the width of the cargo space can be loaded and unloaded through a side door. This capability meets the above described requirement that door size be as small as possible relative to the dimensions of the cargo compartment and cargo units. However, the complicated nature of the concept makes it too expensive for use in adapting an existing airplane to cargo carrying purposes. Also, the apparatus is designed to work with palletized cargo, and this would impose unacceptable penalties in the transport of wheeled and tracked vehicles. The logistics of having pallets available would be complicated and expensive. Also, the time, effort and personnel requirements to palletize and de-palletize the vehicles would have negative economic influence.

British Pat. No. 876,150, "Improvements In Or Relating To The Conveyance Of Freight Or Other Loads By Aircraft," issued to Thomas M. A. O'Connell, discloses a less sophisticated concept which involves "wheeled load carrying platforms" (pallets) and a turntable. The purpose of the turntable is to enable the platforms to be wheeled through the door into the cargo compartment and then re-aligned 90° to permit movement of the platforms into the fore and aft portions of the cargo compartment. In this concept the cargo components can be no longer than the width of the door or the width of the cargo compartment. Also, wheeled or tracked cargo must be palletized, imposing the economic penalties referred to previously. Furthermore, incorporation of the concept into an existing airplane would require extensive structural modification. Similarly, its incorporation into an airplane designated specifically as an aerial tanker would involve undesirable cost and weight penalties.

Many prior art aircraft designed for carrying wheeled or tracked cargo employ entrance/exit facilities at one or both ends of the cargo compartments. A review of these prior art designs indicate that entrance/exit facilities at the ends of the cargo compartments are, as a practical matter, too complicated to be used in most instances for adapting an airplane to transport wheeled or tracked vehicles.

Therefore, the problem solved by subject invention is the provision of economical and effective adaptation of airplanes to the transportation of wheeled or tracked vehicles. The main purposes of such adaptations are (1) to increase the utility of tanker airplanes with minimum penalty to the performance of the airplane in its basic function; (2) to convert passenger airplanes to carry such cargo in times of emergency and (3) to extend the usefulness of airplanes which are no longer competitive in the field for which they were designed.

It is therefore a primary object of this invention to provide simple and economic adaptation for loading and unloading wheeled or tracked vehicles through a side door of a cargo compartment.

It is a further object, in consonance with the economics of the adaptation, that the door be as small as possible relative to the size of the cargo compartment and the vehicles which will fit into it.

It is a further object also that the apparatus be simple, in regard to its manufacture, installation and operation.

SUMMARY OF THE INVENTION

It is therefore an object of the present invention to provide a cargo loading apparatus which is relatively inexpensive and uncomplicated, is readily adapted to installation in a variety of aircraft, either as original equipment or as a modification package, and allows a wheeled or tracked vehicle to be easily loaded into the cargo compartment of an aircraft fuselage through a side door of the fuselage even though the vehicle may have a length greater than either the width of the door or the width of the cargo compartment.

In accordance with the invention, a loading platform is pivotally mounted within the fuselage compartment of an aircraft adjacent a doorway in the side of the aircraft fuselage. A movable ramp is positionable adjacent the doorway outside the aircraft, and means are provided for selectively pivoting the loading platform on its axis between a stowed position completely within the aircraft and a loading position aligned with and adjacent the ramp. The pivot axis of the loading platform is located between the centerline of the doorway and a horizontal line passing through one side of the doorway and parallel to the centerline so that vehicles having a length greater than either the width of the doorway or the width of the cargo compartment may be loaded and unloaded through the doorway. In the loading position, an end portion of the loading platform may extend outside the fuselage and be supported by an end portion of the ramp so that heavy vehicles may be accommodated without damage to the platform and the danger of an abrupt transition between the ramp and the platform will be eliminated.

The novel features which are characteristic of the present invention, and other objects and advantages thereof, will be better understood from the following detailed description and the accompanying drawings which together disclose presently preferred embodiments of the invention.

BRIEF DESCRIPTION OF THE DRAWINGS

FIGS. 3 through 6 are perspective views of a tracked vehicle being loaded into a cargo compartment;

DETAILED DESCRIPTION OF THE INVENTION

Figure 1:
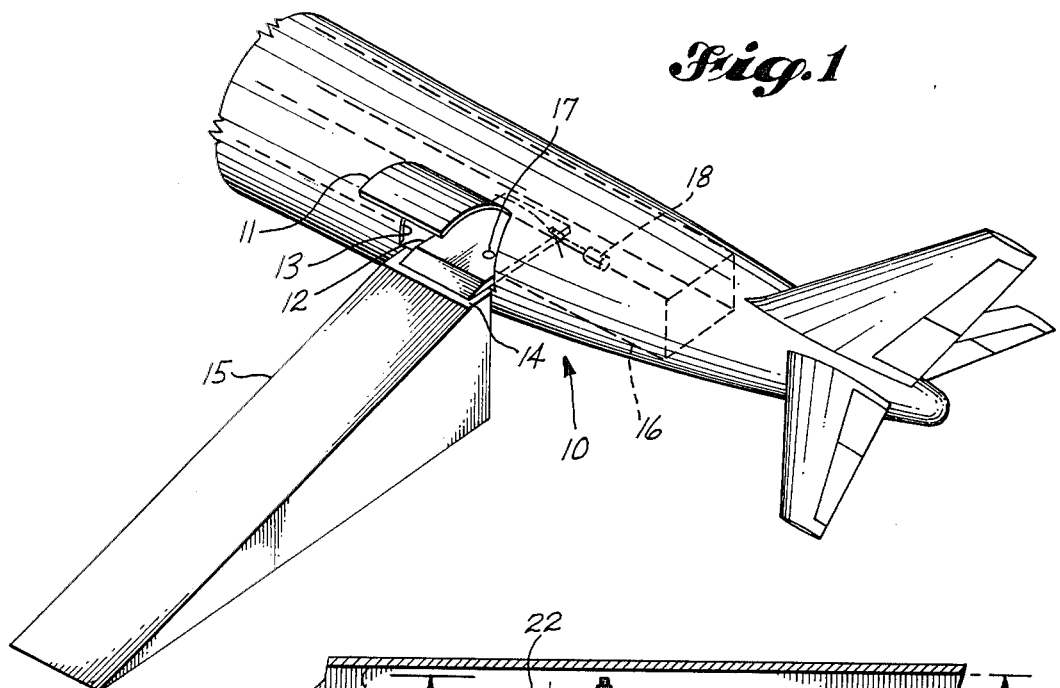
FIG. 1 is a partial perspective view of an airplane having a cargo compartment with a side door, and including a turntable in accordance with the invention.

An airplane fuselage 10 in FIG. 1 has a cargo door 11, shown open, hinged to open outwardly and upwardly from the left hand side of the fuselage. A loading platform in the form of a turntable 12 is shown extending through a doorway opening 13 and over a top surface 14 of a ramp 15. A cargo compartment 16 inside the fuselage is indicated by broken lines. The pivot axis about which the table 12 turns is indicated at 17, and a motor-driven mechanism for turning the turntable is identified at 18.

Figure 2:
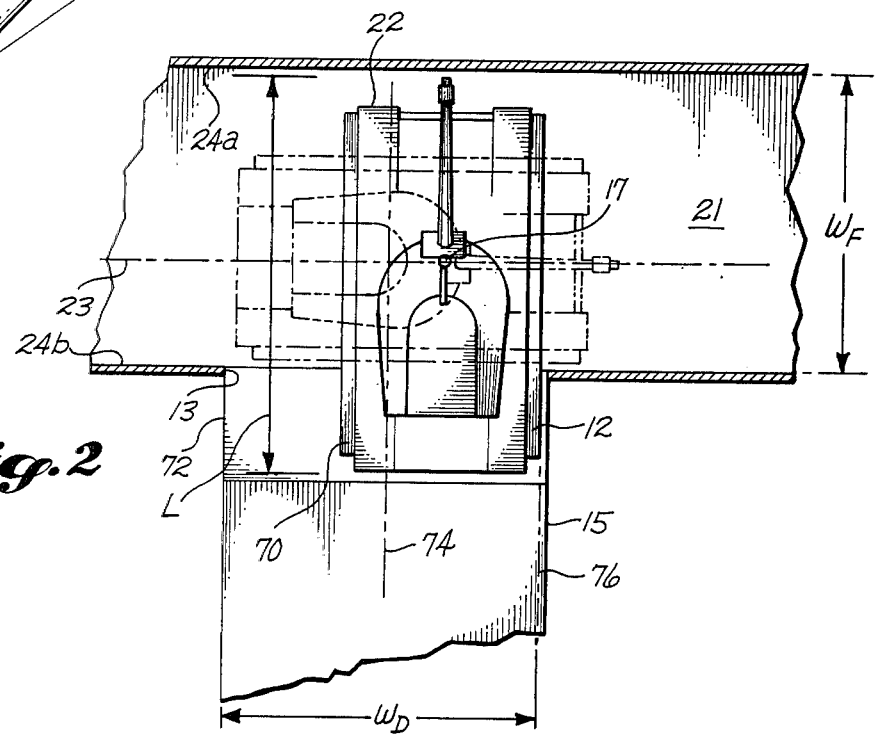
FIG. 2 shows the planform of the doorway, turntable and compartment floor of FIG. 1.

FIG. 2 shows the planform of the doorway 13, the turntable 12, and a floor 21 of the cargo compartment. Further, it shows the orientation of the pivot point 17 with respect to the turntable and doorway. The turntable is shown by solid lines in a loading position for accepting a vehicle 22 from the ramp 15, and the turntable is shown by broken lines in a stowed position with its longitudinal axis 23 parallel to the sides 24a and 24b of the cargo floor. It will be seen from FIG. 2 that a vehicle of length L, which exceeds doorway width $W_D$ and compartment floor width $W_F$, can be accommodated by use of the turntable oriented and pivoted as described.

Figure 3:
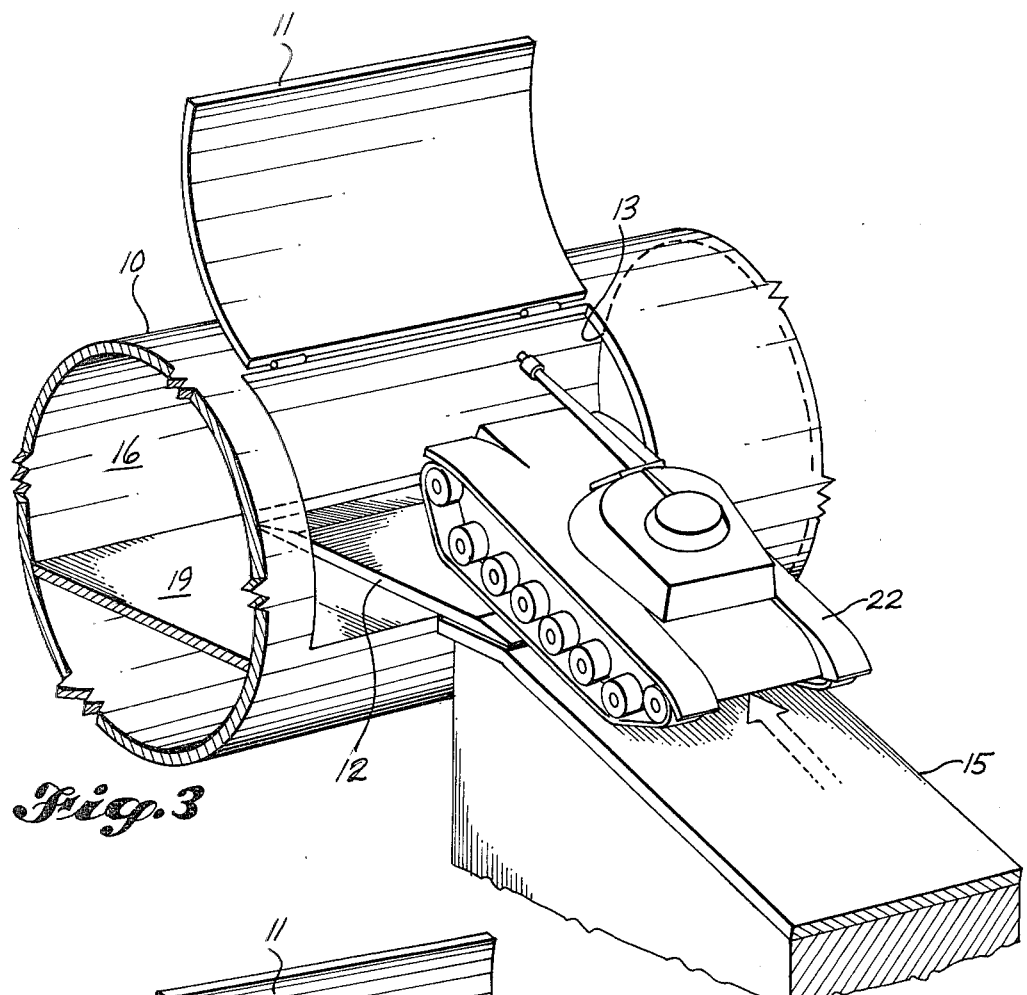

This accommodation is further illustrated in FIGS. 3 through 6. In FIG. 3 the vehicle is just moving from the ramp onto the turntable and the overhung table is supported by the ramp top. This support reduces tipping loads on the airplane, bending loads in the turntable and restraint loads between the turntable and compartment floor.

Figure 4:
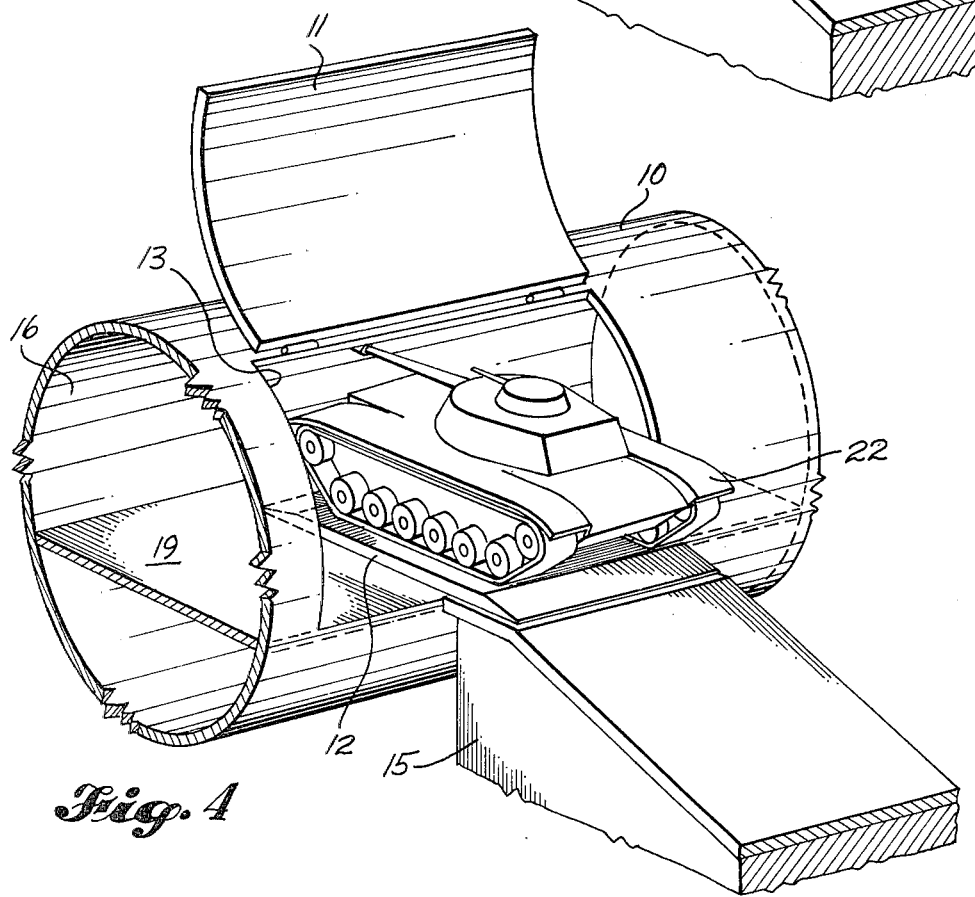

FIG. 4 shows the vehicle entirely supported on the turntable and clearly illustrates that its length exceeds the width of the cargo compartment. FIGS. 5 and 6 illustrate the vehicle being moved completely into the cargo compartment, ready to be driven off the turntable into the cargo compartment, freeing the turntable for loading other vehicles.

Figure 7:
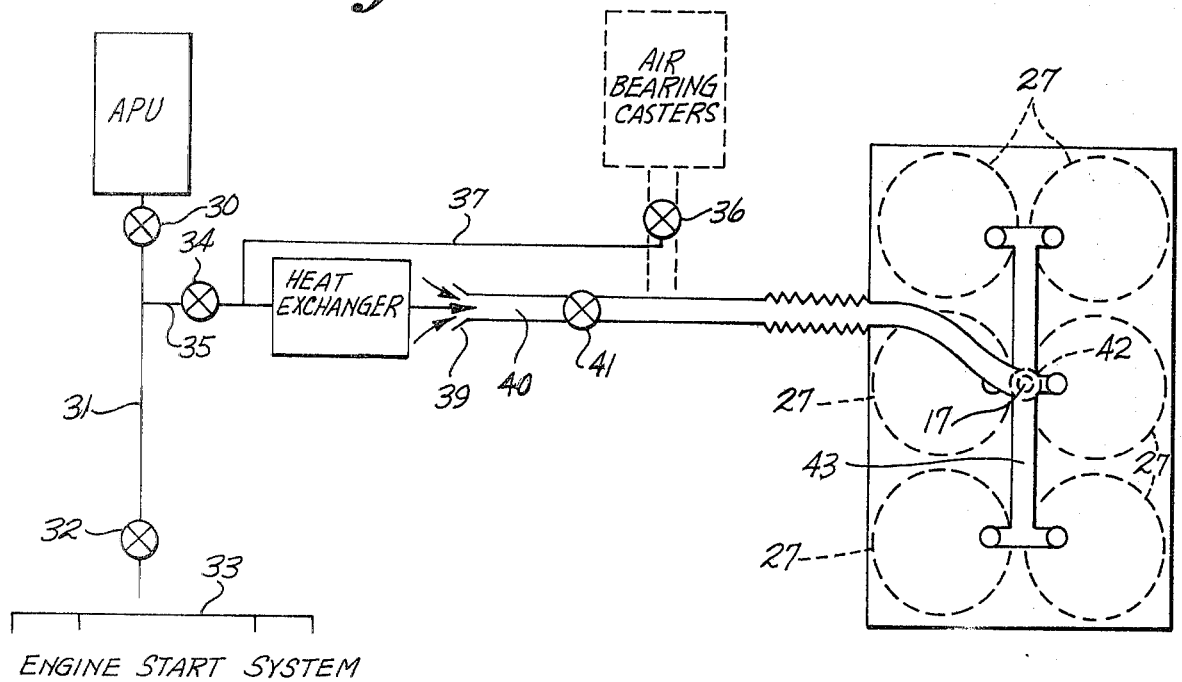
FIG. 7 is a schematic diagram of the apparatus for providing the air to the air bearing casters which support the table and a schematic of the arrangement of the casters under the table.

FIG. 7 schematically illustrates the apparatus which supplies air for suitable air bearing casters 27 arranged, as shown by broken lines, under the turntable 12. Such casters are well within the skill of the art, and a detailed description of the casters is therefore deemed unnecessary. The power source for this apparatus is an Auxiliary Power Unit (APU) 28 with which such airplanes normally are equipped for engine starting and for operating air conditioning systems. Such systems are designed to use an alternate source of air provided from ground equipment 29. For engine starting, the APU supplies air through valve 30, line 31, valve 32 and a manifold 33. When air is required from the APU for the casters, valve 32 is closed, and a valve 34 in a line 35 (connected into line 31) is opened. A valve 36 in line 37 from the ground equipment is closed and the air flows through a heat exchanger 38 to reduce the temperature to a level acceptable by the casters. The air then enters an ejector 39 and ambient air is drawn by it along with the air from the heat exchangers into line 40 through an open valve 41. The air is then delivered via a swivel connection 42 concentric with pivot 17 to an air caster manifold 43 for delivery to the casters. If the ground power is to be used, valve 34 is closed and valve 36 is opened. The design details of the concentric pivot and swivel fitting are well within the capability of persons of ordinary skill in the art and will therefore not be described in detail.

Figure 8:
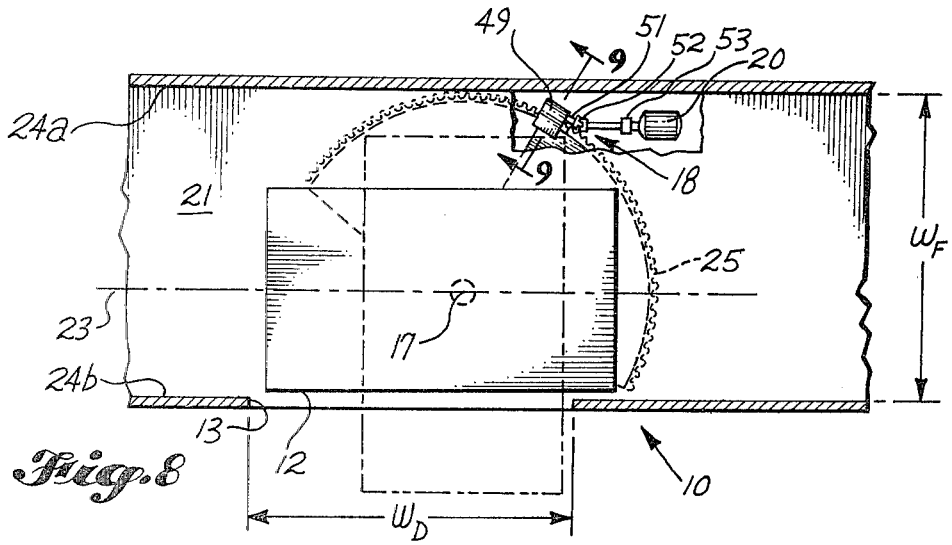
FIG. 8 is a schematic diagram of apparatus for turning the table.
Figure 9:
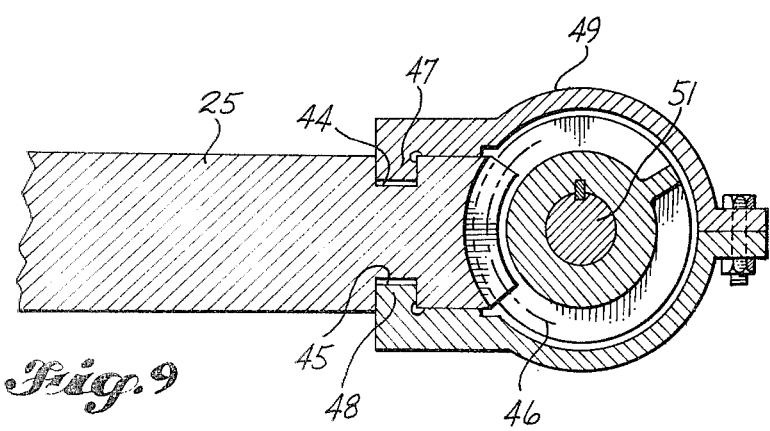
FIG. 9 is a section view showing the engagement of the drive gears and gearing housing of the apparatus shown in FIG. 8.

Referring to FIG. 8, the turntable 12 is shown in planview in the stowed position (solid lines) in relationship to the sides of the cargo compartment floor. The turntable positioned for accepting or delivering vehicles from and to the ramp is indicated by broken lines. The mechanism 18 for pivoting the loading platform 12 includes a gear segment 25 which has its center at pivot point 17 and is attached to the turntable 12. Grooves 44 and 45, see FIG. 9, are concentric with the gear pitch line 46. Flanges 47 and 48 on housing 49 engage the grooves and the housing holds the worm gear in engagement with the teeth. The worm gear is driven by shaft 51 equipped with universal joints 52 and 53. Shaft 51 is driven by a motor 20 which is attached to the floor. The motor may be pneumatic, hydraulic or electric. The forces applied by the worm gear to drive the table are reacted through the shaft and motor to the floor.

Figure 10:
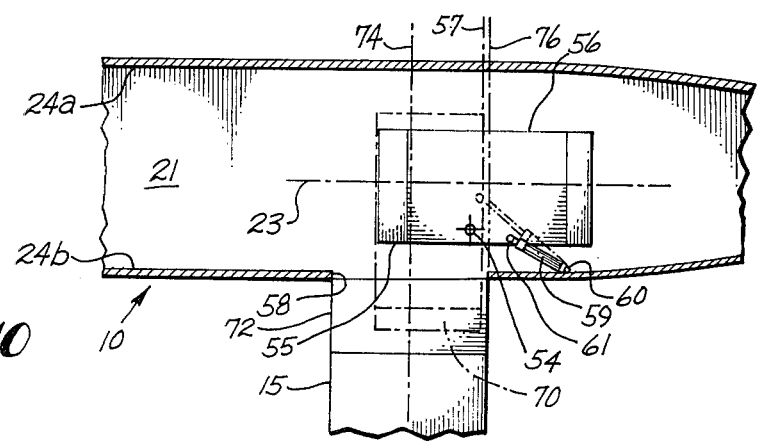
FIG. 10 shows an alternate arrangement of turntable and pivot locations relative to the doorway.

In the turntable arrangement in FIG. 10 a pivot axis 54 is close to side 55 of the rectangular loading platform or turntable 56 and just forward of the midpoint of the length of the table. The pivot point is also just forward of the transverse centerline 74 of doorway 58. Rotation of the turntable 56 in FIG. 10 is accomplished by a linear actuator 59, which is pivoted to the floor at a point 60 and to the table at a point 61. The actuator can be either hydraulic or mechanical (ballscrew). In FIG. 10 broken lines indicate the positions of the turntable and actuator when the turntable has been rotated to the loading/unloading position. This arrangement may be more appropriate to larger aircraft (and larger doorways) than the arrangement shown in FIG. 2.

In operation, the ramp 15 is positioned directly beneath doorway 13, and door 11 is opened. If a vehicle is to be loaded into the aircraft cargo compartment, the loading platform is pivoted from its stowed position inside the cargo compartment to its loading position with an end portion 70 thereof extending over a corresponding portion 72 of the ramp so that the horizontal surface 14 of portion 72 provides support means for end portion 70. The vehicle is then driven up the ramp and, as shown in FIG. 3, moves from the ramp to the loading platform. The transition provided between surfaces of the ramp and platform along the path of vehicle travel is relatively gradual so that the vehicle can make the transition from one to the other without difficulty. As the vehicle makes this transition nearly all of the vehicle's weight will be carried by end portion 70 of the platform, but this weight will be accommodated without difficulty by end portion 70 becasue of the support provided by the ramp.

Once the vehicle has moved entirely onto the loading platform as shown in FIG. 4, the platform is ready for rotation on its vertical pivot axis 17 or 54 to the stowed position. Because the vehicle is longer than the width of the cargo compartment, a rear portion of the vehicle remains extended through the doorway while the platform is in its loading position. However, because the doorway is wider than either the vehicle or the platform, and because the pivot axis is properly placed, the vehicle moves easily through the doorway as the platform moves from the loading to the stowed position as shown in FIGS. 5 and 6.

The vertical pivot axis 17 is preferably located, as shown in FIGS. 2 and 10, between the centerline 74 of the doorway and a horizontal line 76 parallel to the centerline 74. The axis 17 will also preferably be located along the longitudinal centerline 23 of the loading platform near the center of the platform and may be located at the geometric center of the loading platform as shown in FIG. 7 since such a location will more evenly distribute the weight on the platform with respect to the axis and will minimize design problems relative to the pivot mechanism and bearings supporting the platform. However, in some cases it may be desirable, depending on the geometry of the fuselage and cargo compartment and size of the vehicle to be carried, to locate the axis to one side of the platform as shown in FIG. 10.

Once the loading platform is in the stowed position with the vehicle as shown in FIG. 6, the vehicle is pushed or driven off the platform to its cargo position as desired. In this way a number of vehicles may be loaded into the cargo compartment and arranged in cargo positions within the compartment so as to most efficiently utilize available cargo space. Unloading of vehicles at their destination is accomplished with similar ease by reversing the loading procedure.

It will be recognized that the loading apparatus of the invention is particularly well suited to the loading of wheeled or tracked vehicles which are capable of movement up the loading ramp and onto and off of the loading platform under their own power. Although it is preferable that the loading platform, while in the loading position, extend through the doorway outside the fuselage, the invention is not limited to such an arrangement since the rear portion of a vehicle being loaded could overhang the platform and extend through the doorway with all wheels or tracks on the platform and completely within the cargo compartment. In any event, the doorway must be wider than the width of the vehicle so that a portion of the doorway not aligned with the loading platform in the loading position extends beyond at least one side of the platform. The end portion of the vehicle extending through the doorway and outside of the cargo compartment is then able to pass through this portion of the doorway as the loading platform pivots on its axis.

The apparatus described clearly meets the objectives of the subject invention. Means are provided for loading and unloading vehicles which are longer than the width of the door or the width of the cargo compartment. This optimizes the utility of the aircraft and reduces the costs associated with the installation of the cargo door in the side of the fuselage. The apparatus is simple in itself and simply installed, requiring minimal deviation from the structure of aircraft not provided with cargo handling apparatus. Operation is also simple, requiring only the operation of the turntable.

One embodiment of the invention has been described and it is recognized that alternate embodiments not departing from the essence of the invention can be conceived, along with variations of the one described. Accordingly, this invention is to be limited only by the scope of the appended claims.

What is claimed is:

1. A cargo loading apparatus for an aircraft having a fuselage, a fuselage compartment, and a doorway in the side of the fuselage for providing access to the fuselage comprising:
    a loading platform pivotally mounted to the fuselage on a fixed axis through said loading platform and within said fuselage compartment, said axis fixed with respect to both said loading platform and said fuselage and located between the centerline of said doorway and a horizontal line parallel to said centerline which passes through one side of said doorway, said loading platform pivotable between a loading position and a stowed position;
    means for selectively moving said loading platform between said loading position and said stowed position; and
    a loading ramp positionable outside said aircraft adjacent said doorway,
    said axis being a vertical axis located at the geometric center of said loading platform.

2. A cargo loading apparatus for an aircraft having a fuselage, a fuselage compartment, and a doorway in the side of the fuselage for providing access to the fuselage compartment; said cargo loading apparatus comprising:
    a loading platform pivotally mounted to the fuselage on a fixed axis through said loading platform and within said fuselage compartment, said axis fixed with respect to both said loading platform and said fuselage and located between the centerline of said doorway and a horizontal line parallel to said centerline which passes through one side of said doorway, said loading platform pivotable between a loading position and a stowed position;
    means for selectively moving said loading platform between said loading position and said stowed position; and
    a loading ramp positionable outside said aircraft adjacent said doorway;
    said loading platform having a longitudinal centerline and, with said loading platform in said stowed position, said axis located between said longitudinal centerline of said loading platform and said doorway.

* * * * *